Dec. 30, 1952   J. G. PUTNOCKY, JR   2,624,017
ALTERNATING CURRENT OR DIRECT CURRENT TIMING MOTOR
Filed Dec. 12, 1949
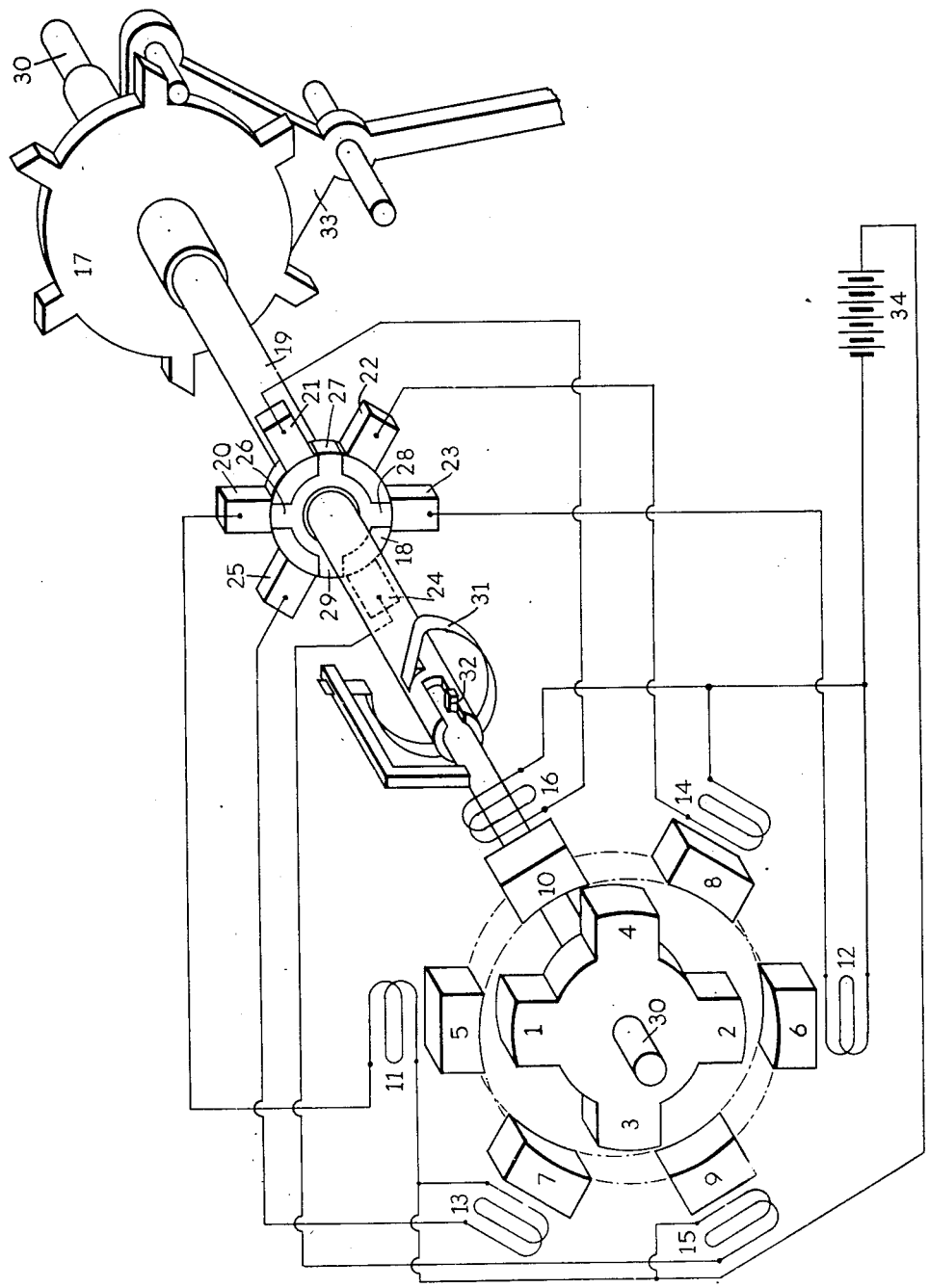
INVENTOR
Joy H.G. Putnocky Jr.

Patented Dec. 30, 1952

2,624,017

UNITED STATES PATENT OFFICE 2,624,017

ALTERNATING CURRENT OR DIRECT CURRENT TIMING MOTOR

Joseph G. Putnocky, Jr., Fairfield, Conn.

Application December 12, 1949, Serial No. 132,435

2 Claims. (Cl. 310—46)

My invention relates to improvements in alternating current or direct current electric timing motors.

An important object of the invention is that it will operate on direct current or alternating current independent of the frequency of the alternating current.

In the accompanying drawing, an exploded oblique projection, forming a part of this specification, like numerals are employed to designate like parts throughout the same.

This timing motor, as shown in the drawing, is of the intermittent rotation type, the rate of speed being controlled by an escapement actuated by balances and balance springs or by a pendulum.

The motor consists of a four pole rotor and a six pole field, or any multiple thereof, which gives an intermittent rotating increment of 30 degrees, in this case, from rotor pole-field pole line up, to the next rotor pole-field pole line up. That is to say, to cause right hand rotation from the position as shown on the drawing where rotor poles 1 and 2 are held by field poles 5 and 6 respectively, field poles 7 and 8 must be energized to attract rotor poles 3 and 4 just ahead of or overlapping the deenergizing of field poles 5 and 6.

This rotation is made possible by the commutator and escapement unit.

Field poles 5, 6, 7, 8, 9 and 10 are energized by field windings 11, 12, 13, 14, 15 and 16, as is indicated on the drawing.

The increment of the escapement wheel 17 must be the same as the intermittent rotating increment of the rotor, 30 degrees in this case. The commutator drum 18 and escapement wheel 17 are fastened to the same shaft 19 in the proper phase relationship and form one unit.

The commutator 18 has as many brushes as there are field windings, six as shown. The brushes are 20, 21, 22, 23, 24 and 25.

The commutator drum has as many contact segments as there are rotor poles, four as shown; all are connected together for electrical purposes but are insulated from the shaft. The contact strips are 26, 27, 28, and 29.

The escapement wheel commutator shaft 19 is hollow and is a slip fit, free turning, on the main rotor shaft 30 but is connected to the rotor shaft by a torsion spring 31 along with a pin 32 fastened in shaft 30 and a slot in the end of shaft 19, which allows rotation between the two shafts equal to the increment, or 30 degrees. This is also to be in the proper phase relative to rotor poles and escapement position. The torsion spring 31 is armed so that shaft 19 relative to shaft 30, is tending to rotate in the direction of the motor, which is right hand on the drawing.

There is a zero phase set up between commutator brushes 20, 21, 22, 23, 24 and 25 and the corresponding field windings 11, 12, 13, 14, 15 and 16, as is evident from the drawing.

The operation of this motor when the electrical power 34, either direct current or alternating current of any frequency, is put on and the balance wheel or pendulum gets into motion, is as follows:

The electrical power 34, as shown on the drawing, has energized field windings 11 and 12. Tracing the circuit, it can be seen that it is completed through brush 23, commutator segments 28 and 26 and brush 20. Rotor poles 1 and 2 are held in place by field poles 5 and 6 energized by windings 11 and 12 respectively.

Torsion spring 31 is tending to rotate shaft 19 in the direction of rotation, right hand, which at the instant shown on the drawing, has yet to be released one increment by the escapement lever 33.

When escapement lever 33, actuated either by balances and balance springs or by a pendulum, releases escapement wheel 17 one increment, receiving at the same time its impulse, shaft 19 rotates one increment.

Commutator 18 being on the same shaft also rotates one increment.

Therefore, commutator segments 26 and 28 will move out from under brushes 20 and 23 respectively, and break the circuit for field windings 11 and 12 after commutator segments 27 and 29 have moved under brushes 22 and 25 respectively, closing the circuit for field windings 13 and 14.

This causes field poles 7 and 8 to be energized, which attract rotor poles 3 and 4 respectively, and as soon as the circuit on field windings 11 and 12 is broken, rotor poles 3 and 4 rotate one increment and line up with field poles 7 and 8. This also winds up or arms torsion spring 31 back to the position as shown on the drawing and the cycle is ready to repeat.

With the layout of four rotor poles and six field poles as shown on the drawing, it will take twelve cycles, as described, to effect one complete turn of the rotor and main shaft.

The firing order of the field poles is 5 6, 7 8, 9 10 and repeat.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, I claim:

1. A uniform torque cycle drive for an escapement controlled timing mechanism comprising a magnetic motor having a shaft and an unwound salient pole rotor thereon of $n$ poles and a stator having $n+2$ windings for producing $n+2$ poles circumferentially spaced about the rotor, means for sequentially connecting pairs of diametrically disposed pole windings to electrical energy terminals, said means comprising a commutator assembly having a shaft and a commutator thereon, the commutator having $n$ electrically interconnected segments, and said means also including $n+2$ stationary brushes electrically connected with said windings, lost motion means coupling said shafts providing a restricted angle of relative rotation between said commutator and rotor, the magnitude of said angle being a function of the sequence of energization of said pole windings, said lost motion coupling means including resilient means pre-set to yieldingly resist relative shaft motion through said angle, the rotation and motion of the commutator being controlled by the escapement controlled timing mechanism and resulting from an initial pre-set torque between the rotor and the commutator plus a torque feed back from the rotor to the commutator, said commutator being the driver for the escapement controlled timing mechanism, the maximum driving torque being the feed back torque plus the pre-set torque at the start of the escapement cycle, and said escapement permitting the commutator to rotate the said angle and consuming the torque feed back, leaving only the pre-set torque at which time the commutator assembly by its electrical switch action will apply electrical energy to the winding next in the sequence and by magnetic attraction will effect rotation of the rotor assembly by an amount equal to said angle, at which point the said feed back torque will again be applied to the escapement and the uniform torque cycle will result.

2. A uniform torque cycle drive for an escapement controlled timing mechanism comprising a magnetic motor having a rotor of $n$ salient poles and a stator with windings for providing $n+2$ poles circumferentially spaced about the rotor, means for sequentially connecting the windings to electrical energy terminals to produce in sequence said stator poles, said means comprising a commutator having $n$ electrically inter-connected spaced segments, said means also including $n+2$ stationary brushes spaced about and engaging said commutator, said brushes being connected with said windings whereby rotation of the commutator sequentially energizes said windings, lost motion means coupling the commutator with the rotor and providing a limited angle of relative rotation therebetween, the magnitude of said angle being a function of the sequence of energization of said windings, said coupling means including resilient means pre-set to yieldingly resist relative motion through said angle, the rotation and motion of the commutator being controlled by the escapement controlled timing mechanism and resulting from the pre-set torque between the commutator and the rotator plus a torque feed back from the rotor to the commutator said commutator being the driver for the escapement controlled timing mechanism, the maximum driving torque being the feed back torque plus the pre-set torque at the start of the escapement cycle, and said escapement permitting the commutator to rotate said angle of lost motion and consuming the torque feed back, leaving only the pre-set torque at which time the commutator by its switch action will apply electrical energy to the winding next in sequence and by magnetic attraction will effect rotation of the rotor by an amount equal to said angle, at which point the said feed back torque will again be applied to the excapement and the uniform torque cycle will result.

JOSEPH G. PUTNOCKY, Jr.

REFERENCES CITED

The following references are of record in the file of this patent:

UNITED STATES PATENTS

| Number | Name | Date |
|---|---|---|
| 2,422,067 | Bechberger | June 10, 1947 |